Patented Nov. 18, 1941

2,263,262

UNITED STATES PATENT OFFICE 2,263,262

MANUFACTURE OF SULPHAMIC ACID

Martin Eli Cupery, Wilmington, Del., assignor to E. I. du Pont de Nemours & Company, Wilmington, Del., a corporation of Delaware No Drawing. Application May 20, 1939, Serial No. 274,807

5 Claims. (Cl. 23—166)

This invention relates to the manufacture of sulphamic acid and more particularly to improved processes in which sulphur dioxide under superatmospheric pressure is reacted with a hydroxylamine-yielding compound.

It has long been known that sulphur dioxide will react with hydroxylamine salts to yield sulphamic acid. Such procedures have been used to prepare laboratory samples of sulphamic acid, but the process has never become commercially important because excessive amounts of reagents were required under conditions such that the excess used was not readily recoverable. Moreover, the sulphamic acid which formed was difficult to isolate in satisfactory yield. Divers & Haga, Journal of the Chemical Society 1896, vol. 69, p. 1638, disclose such methods of preparing sulphamic acid from hydroxylamine and sulphur dioxide. Their methods, however, produce solutions of sulphamic acid which must be concentrated before the sulphamic acid will crystallize out. Since sulphamic acid is subject to hydrolysis at temperature appreciably above 50° C., vacuum concentration is essential to the recovery of the sulphamic acid formed. Moreover, in these procedures the yield is further impaired by the formation of by-products, and this particularly if means other than vacuum concentration are employed to isolate the sulphamic acid formed.

I have now found that sulphamic acid can be prepared by reacting sulphur dioxide under superatmospheric pressure with a hydroxylamine-yielding compound. By the use of sulphur dioxide under superatmospheric pressure the use of the large volumes of reagent solutions and the large excesses of reagents required in the prior art processes is avoided; the reaction is completed more rapidly; and sulphamic acid is produced in a form which is more easily isolated than is possible in the prior art processes. The reaction may be carried practically to completion without the formation of undesirable by-products and at the same time the sulphamic acid is precipitated from the reaction mixture in a crystallized and easily isolated form without the necessity of resorting to concentration of the solution for this purpose.

In carrying out my invention a suspension or solution of the hydroxylamine-yielding compound in water is placed in a closed vessel capable of withstanding pressure. The vessel is then charged with sulphur dioxide to the desired pressure and the reaction mixture is kept at the desired temperature by means of adequate stirring and cooling. The reaction proceeds rapidly at first and gradually becomes slower. After a suitable period the pressure is released and the excess sulphur dioxide removed under reduced pressure. The excess sulphur dioxide thus recovered may be used again. The solid sulphamic acid is then removed from the reaction mixture by filtration or centrifuging. Coarse, granular crystals of the acid are obtained which make for ease of separation from the reaction mixture.

According to one modification of my invention I react sulphur dioxide under superatmospheric pressure with hydroxylamine in aqueous sulphuric acid. In this manner I take advantage of the effect of the sulphuric acid in suppressing the solubility of the sulphamic acid formed so that more of the sulphamic acid crystallizes out of the reaction mixture than would be the case if the reaction were carried out without the sulphuric acid. The sulphuric acid may be introduced into the reaction mixture either as such or as hydroxylamine sulphate. In the latter case the sulphuric acid is liberated during the course of the reaction, thus reducing the solubility of the sulphamic acid formed in the reaction mixture.

The following examples will serve to illustrate detailed practices of my invention. Unless otherwise specified parts are given by weight and pressures are given as gauge readings, i. e., pounds per square inch above atmospheric pressure.

Example 1

A mixture of 20.5 parts of hydroxylamine sulphate $(NH_2OH)_2 \cdot H_2SO_4$ and 22 parts of water is exposed, in a suitable pressure vessel, to sulphur dioxide gas under a pressure of about 30 pounds per sq. in. Cooling and slow stirring are required at the start to maintain a solution temperature of about 10° C. After standing at 10–15° C. for a period of 4½ hours the pressure is released. The excess sulphur dioxide is then removed from the reaction mixture by placing it for ½ hour under reduced pressure of about 1½ pounds per sq. in. absolute. The coarse crystals of sulphamic acid which are formed are then separated by filtration and washed separately with ice water, alcohol, and acetone. Seventeen and one-half parts, or a yield of 71.4% based on hydroxylamine, of practically pure sulphamic acid is obtained.

A still greater yield is obtainable by increasing the sulphuric acid concentration of the reaction mixture. The following example is illustrative:

Example 2

To 40 parts of 60% sulphuric acid is added 8 parts of hydroxylamine, and the mixture, which contains partly undissolved hydroxylamine sulphate, is placed in a suitable container and exposed to sulphur dioxide gas under a pressure of about 45 pounds per square inch for a total period of about 3 hours. Provision is made for slowly stirring the mixture and for cooling it during the start of the reaction, and the temperature is maintained at about 20–25° C. The pressure is then released, and the residual sulphur dioxide is removed under a reduced pressure of about one pound per square inch absolute. Only a trace of sulphur dioxide remains in the reaction mixture. The coarse crystalline product may then be separated by filtration and washed as already described. Twenty parts of dry sulphamic acid is obtained. This corresponds to a yield of 85% of the theoretical based on hydroxylamine.

In the processes of Examples 1 and 2 very little sulphamic acid remains in solution after separation of the crystalline sulphamic acid, and at concentrations above about 20% sulphuric acid the effect of the sulphuric acid is pronounced. At sulphuric acid concentrations above about 40% and up to 85 or 90% or more, the amount of sulphamic acid remaining dissolved is negligible. When I speak of sulphuric acid concentration I refer to the "sulphuric acid equivalent" of the reaction mixture, i. e., to the strength of the sulphuric acid obtained after the sulphamic acid has been separated. Thus, the reaction mixtures of Examples 1 and 2, respectively, have a sulphuric acid equivalent of about 37.5% and about 50% sulphuric acid.

Another modification of my invention is exemplified by the action of sulphur dioxide under superatmospheric pressure on acetoxime. In this reaction the acetoxime under goes hydrolysis during the course of the reaction and the final products are sulphamic acid and acetone. For all practical purposes the reaction proceeds as if reagents were simply hydroxylamine and sulphur dioxide, and the acetoxime may be considered merely as a reagent for producing hydroxylamine in situ in the reaction mixture. The following example illustrates this process:

Example 3

Seventy-three (73) parts of acetoxime dissolved in 77 parts of water and cooled to 10° C. is subjected to excess sulphur dioxide vapor under a pressure of about 30 pounds per square inch for a period of one hour. The reaction mixture is then gradually warmed to 30° C. during one-half hour and allowed to stand at this temperature for an additional one-half hour at the same pressure. The pressure is then released, and the residual dissolved sulphur dioxide is removed under subatmospheric pressure. Upon separation of the product about 60 parts of nearly pure sulphamic acid, or a yield of about 60%, is obtained.

My invention may also be carried out with other hydroxylamine salts, for example, hydroxylamine hydrochloride, but the proportion of sulphamic acid remaining in solution that crystallized out is greater than in the case of hydroxylamine sulphate. The following example is illustrative:

Example 4

Seventy (70) parts of hydroxylamine hydrochloride and 30 parts of water cooled to about 5° C. are exposed to sulphur dioxide vapor under a pressure of 22.5 pounds per square inch for a period of one hour, cooling and stirring as required to maintain the temperature at about 5° C. The mixture is then gradually warmed to 20° C. during a period of one hour while keeping the sulphur dioxide pressure constant at 22.5 pounds per square inch. After standing at 20° C. for an additional hour, the pressure is released and a vacuum applied to the system to remove excess sulphur dioxide. The latter is recovered by compressing and suitable cooling. The crystalline product present in the reaction mixture is removed by filtration and partly purified by washing once with 15 parts of ice water. About 60 parts of very nearly pure sulphamic acid, or a yield of about 60%, will be obtained. Some sulphamic acid remains dissolved in the reaction mixture filtrate and ice-water washing solution.

It is to be understood that the foregoing examples are given merely to explain and illustrate the nature of my invention and that the scope of my invention is not limited to any of the particular conditions set forth.

In carrying out my invention I may use any hydroxylamine-yielding compounds, that is to say, any compound which during the course of the reaction yields hydroxylamine whereby the final product is sulphamic acid. Such compounds may be simple addition products such as the hydroxylamine salts or they may be more complex compounds which yield or split off hydroxylamine in situ, such as condensation products of hydroxylamine and carbonyl compounds. For the most part these compounds fall in two classes, namely, addition products of hydroxylamine and hydrolytes of hydroxylamine. Hydroxylamine addition products comprise the hydroxylamine salts, which may be of either mineral or organic acids. Hydroxylamine also forms an addition product with water. This may be considered as yielding hydroxylamine during the course of the reaction. Hydroxylamine hydrolytes are compounds which upon hydrolysis yield hydroxylamine. The oximes such as acetoxime, methyl ethyl ketoxime, cyclohexanoneoxime, mesityl oxide oxime, aldoxime, butaldoxime, acroleinoxime, and compounds having the equivalent structure such as hydroxamic acid are such compounds. The hydroxylamine-yielding compound may be formed in situ. For example, a hydroxylamine hydrolyte such as hydroxylamine disulphonate $HON(SO_3H)_2$ formed by the reduction of nitrites with sulphur dioxide may be further reacted with sulphur dioxide under pressure to yield sulphamic acid.

While I have disclosed a number of hydroxylamine-yielding compounds of different types I desire it understood that in its broadest aspects I conceive my invention as involving new and improved methods of reacting sulphur dioxide with hydroxylamine-yielding compounds and that my invention in its broadest aspect is not limited to any particular hydroxylamine-yielding compound or any particular class of hydroxylamine-yielding compounds but that any compound which reacts with sulphur dioxide to yield sulphamic acid may be reacted with sulphur dioxide in accordance with the processes described.

The temperature of the reaction is controlled in order to prevent the reaction, which is exothermic at start, from proceeding too rapidly and in order to avoid hydrolysis of the sulphamic acid formed. Thus, the temperature may be varied within limits determined by the rate of reaction and the tendency of the sulphamic acid to hydrolyze. With these considerations in mind those skilled in the art will be capable of selecting suitable temperatures. Ordinarily, however, temperatures above about 0° C. give a reaction rate too slow for any practical purposes, and temperatures above about 50° C. should be avoided if a maximum yield of sulphamic acid is to be obtained. Temperatures ranging from 5 to 35° C. will ordinarily be found suitable.

The pressure should be so correlated to the temperature that the sulphur dioxide does not liquefy within the reaction equipment. In other words, with any given pressure the temperature should not be below the critical temperature and for any given temperature the pressure should not be above the critical pressure. Consequently, if low temperatures are required correspondingly low pressures should be employed. If higher temperatures are used, higher pressures may likewise be used. By a combintion of low pressures and high temperatures it is possible to decrease the rate of absorption of sulphur dioxide by the reaction mixture. Thus, it will be apparent that the pressure may be varied over wide limits but will ordinarily be chosen as less than the critical pressure of sulphur dioxide at the temperature employed. Suitably, the pressure may vary from about 15 to about 100 pounds per square inch gauge. At temperatures ranging from about 5 to about 30° C. pressures in the order of about 20 to about 50 pounds per square inch gauge are preferred.

The presence of liquid sulphur dioxide is not in itself objectionable but is generally associated with undesirable and unnecessary excess. In some cases, however, it will be found desirable and expedient to introduce a measured excess quantity of liquid sulphur dioxide into the reaction vessel, then allow the reaction mixture to stand at the vapor pressure of the sulphur dioxide at the temperature employed.

The most suitable concentrations of the reaction mixture for carrying out the reaction are those that give a satisfactorily high yield of crystalline sulphamic acid directly without concentration of the reaction medium. Preferably no more water is used than is consistent with good crystallization technique. In general the amount of water may be as much as ten times, tho preferably not more than about three times the "hydroxylamine equivalent" of the hydroxylamine-yielding compound employed. By the expression, hydroxylamine equivalent, is meant the theoretical quantity of hydroxylamine which may be derived from a compound capable of yielding hydroxylamine under the conditions employed. For example, 73 parts of acetoxime would theoretically yield 33 parts of hydroxylamine and in 77 parts of water gives a solution in which the amount of water by weight is somewhat greater than twice the weight of hydroxylamine equivalent of the acetoxime. Similarly, 20½ parts of hydroxylamine sulphate in 22 parts of water gives a reaction mixture in which the amount of water by weight is approximately 2.7 times the weight of the hydroxylamine equivalent of the hydroxylamine sulphate.

When hydroxylamine sulphate is employed the amount of water may also be proportioned in accordance with the available sulphuric acid. By adjusting the amount of water in accordance with the sulphuric acid available from the hydroxylamine sulphate during the course of the reaction, sulphuric acid will be formed of sufficient strength materially to aid crystallization of the sulphamic acid. It will ordinarily be sufficient for this purpose if the water and hydroxylamine sulphate are so proportioned that the resulting mixture contains at least 15% combined sulphuric acid. As the combined sulphuric acid content is increased two factors are operative to effect increased yield of crystalline sulphamic acid. Thus, the proportion of hydroxylamine equivalent to water increases concurrently with an increase in the sulphuric acid equivalent with the result that increased quantities of sulphamic acid are formed per unit volume of reaction mixture and concurrent with a decrease in the solubility of the sulphamic acid in the reaction mixture. At a combined sulphuric acid concentration of at least about 25% very little sulphamic acid remains dissolved in the reaction mixture.

The time of the reaction will vary with the temperature employed, the pressure of sulphur dioxide used, the rate of stirring, the efficiency of cooling the reaction mixture, and the concentration of the reagents used. Those skilled in the art with a little experience will readily be able to judge the time most suitable for carrying out the reactions. In general the reaction has been found to be substantially complete after about one hour, but an extended period up to a total of about 3 to 5 hours is often desirable, depending upon the particular conditions under which the reaction is effected.

Since the processes of my invention may take many apparently widely differing forms it is to be understood that any modification thereof or variation which conforms to the spirit and scope of the invention is intended to be included within the scope of the claims.

I claim:

1. The process of making sulphamic acid which comprises reacting in an aqueous medium sulphur dioxide under a pressure of about 20 to about 50 pounds per square inch gauge with a hydroxylamine-yielding compound in proportions such that sulphamic acid is formed in excess of its solubility in the reaction mixture, said reaction being effected at a temperature of about 5° C. to about 30° C., the temperatures and pressures being so correlated that no liquid sulphur dioxide is formed during the course of the reaction.

2. The process of making sulphamic acid which comprises reacting sulphur dioxide under a pressure of about 15 to about 100 pounds per square inch gauge with a hydroxylamine-yielding compound in the presence of water in an amount by weight less than about 3 times the weight of the hydroxylamine equivalent of said hydroxylamine-yielding compound, the temperatures and pressures being so correlated that no liquid sulphur dioxide is formed during the course of the reaction.

3. In the manufacture of sulphamic acid by the interaction of sulphur dioxide with a hydroxylamine-yielding compound the method whereby the reaction may be carried to completion within several hours and the major portion of the sulphamic acid formed recovered as a crystalline precipitate without the necessity of resorting to special treatment which comprises dispersing the hydroxylamine-yielding compound in an aqueous medium in excess of its solubility therein and exposing the resulting suspension to sulphur dioxide under superatmospheric pressure sufficient to provide throughout the reaction an excess of sulphur dioxide, the temperatures and pressures being so correlated that no liquid sulphur dioxide is formed during the course of the reaction.

4. The process of claim 3 in which the hydroxylamine-yielding compound is hydroxylamine sulphate.

5. The process of claim 2 in which the hydroxylamine-yielding compound is hydroxylamine sulphate.

MARTIN ELI CUPERY.